US012234758B1

(12) United States Patent
Tan et al.

(10) Patent No.: US 12,234,758 B1
(45) Date of Patent: Feb. 25, 2025

(54) EXHAUST ASSEMBLY TEMPERATURE REGULATION FOR SHUTDOWN

(71) Applicant: Caterpillar Inc., Peoria, IL (US)

(72) Inventors: Dongming Tan, Eastvale, CA (US); Bradley Hodges, Keller, TX (US); Albert Yueh-Chang Lee, Edwards, IL (US); Joseph Lee Kennedy, Peoria, IL (US); Zheng Zhang, Dunlap, IL (US); Scott A Snoble, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/434,599

(22) Filed: Feb. 6, 2024

(51) Int. Cl.
*F01N 13/10* (2010.01)
*F01N 3/04* (2006.01)
(Continued)

(52) U.S. Cl.
CPC ................ *F01N 3/046* (2013.01); *F01P 3/20* (2013.01); *F01P 11/029* (2013.01); *F02B 39/005* (2013.01); *F02B 39/14* (2013.01); *F01N 13/10* (2013.01); *F01P 2003/006* (2013.01); *F01P 2060/12* (2013.01)

(58) Field of Classification Search
CPC .... F01N 3/046; F01N 13/004; F01N 2260/02; F01N 2260/024; F01P 11/028; F01P 11/029
See application file for complete search history.

(56) References Cited

U.S. PATENT DOCUMENTS 4,622,925 A * 11/1986 Kubozuka ............ F01P 3/2271 123/41.27
10,989,102 B2 * 4/2021 Han ...................... F01P 11/028
(Continued)

FOREIGN PATENT DOCUMENTS

CN 104500192 10/2017
CN 109184885 A * 1/2019
(Continued)

OTHER PUBLICATIONS

Machine translation of CN-109184885-A, accessed Jun. 28, 2024. (Year: 2024).*
(Continued)

*Primary Examiner* — Jonathan R Matthias
(74) *Attorney, Agent, or Firm* — Lee & Hayes, P.C.

(57) ABSTRACT

This disclosure describes an exhaust assembly that includes an exhaust tube and a coolant passage. The exhaust tube is oriented about an axis and an exhaust gas is configured to flow through the exhaust tube in a direction away from an end of the exhaust tube. The coolant passage is oriented about the axis radially outward of the exhaust tube, the coolant passage having an inner shell and an outer shell. The exhaust assembly further includes an expansion reservoir positioned vertically (relative to a gravitational reference) above the coolant passage. The expansion reservoir and coolant passage are fluidly coupled by a conduit having a first diameter. The expansion reservoir is coupled with a coolant reservoir by a second conduit having a diameter less than the first diameter. Vapor after a hot shutdown travels up the first conduit and is replaced by coolant flowing down the first conduit.

19 Claims, 4 Drawing Sheets

(51) Int. Cl.

| | |
|---|---|
| ***F01P 3/20*** | (2006.01) |
| ***F01P 11/02*** | (2006.01) |
| ***F02B 39/00*** | (2006.01) |
| ***F02B 39/14*** | (2006.01) |
| *F01P 3/00* | (2006.01) |

(56) References Cited

U.S. PATENT DOCUMENTS

| | | | | |
|---|---|---|---|---|
| 2003/0029394 | A1* | 2/2003 | Miyagawa | F01P 5/10<br>123/41.54 |
| 2021/0062705 | A1* | 3/2021 | Kennedy | F28F 9/20 |

FOREIGN PATENT DOCUMENTS

| | | | | | |
|---|---|---|---|---|---|
| DE | 102006014400 | A1 | * | 8/2007 | F01P 11/028 |
| FR | 2564140 | A1 | * | 11/1985 | |
| FR | 2669962 | A1 | * | 6/1992 | F01P 3/2271 |
| JP | H1162579 | | | 3/1999 | |
| KR | 20040017630 | | | 2/2004 | |

OTHER PUBLICATIONS

Machine translation of DE-102006014400-A1, accessed Jun. 28, 2024. (Year: 2024).*

* cited by examiner

EXHAUST ASSEMBLY TEMPERATURE REGULATION FOR SHUTDOWN

TECHNICAL FIELD

The present application relates generally to gas-powered and other internal combustion engines. More particularly, the present application relates to temperature regulation for exhaust assemblies of gas engines to prevent coolant boiling after shutdown of the gas engines.

BACKGROUND

Internal combustion engines may be configured to convert gasoline, natural gas, landfill gas or other fuel into mechanical energy. Large-scale gas engines often include water-cooled exhaust manifolds that include a steel shell and case runner. Though referred to herein as gas engines, the description is intended to be applicable to internal combustion engines regardless of fuel sources. The manifolds for gas engines may fail resulting in coolant leaks into the exhaust system. During normal or steady state operation of the gas engines, the water-cooled exhaust manifolds maintain temperatures of the exhaust systems to within desired levels.

During a hot shutdown of the gas engines, the coolant may cease to circulate (e.g., due to stopping operation of a coolant pump system) and therefore the coolant may remain stationary within the manifold (e.g., within the jacket). Typical exhaust manifold systems that experience a hot shutdown (e.g., a sudden, unplanned, unexpected, or immediate shutdown) result in stagnant coolant that results in energy being transferred to the coolant and coolant boiling. Coolant boiling within the manifold results in localized vapor pockets where steel components of the manifolds reach elevated temperatures and results in damage to the manifold. The damage may include high stresses due to the localized temperature pockets, cracking, coolant leaks, and other such damage.

An example system for an exhaust assembly including air and/or water-cooling is described in Japanese Patent Publication JPH1162579A to Iida et al., titled "Cooling Device for Internal Combustion Engine" (hereinafter referred to as the '579 document). In particular, the '579 document describes a part of cooling water fed from a water pump to an exhaust manifold water jacket when a heater valve is opened. Steam from the boiling coolant is stored in an air catcher tank and when an excessive amount of steam is stored and the pressure inside the heater core reaches a threshold, then a valve opens to discharge the steam.

Although the system described in the '579 document is configured to provide cooling for an exhaust manifold of an internal combustion engine during operation, it is not able to ensure that coolant (e.g., water) does not boil and leave the exhaust manifold dry (either locally or across large portions) after a hot shutdown event of the engine that results in stopping a coolant pumping system of the engine (e.g., a water pump of the engine). As a result, the system described in the '579 document is not configured to prevent localized heating within a water-cooled exhaust manifold system or to prevent the subsequent localized overheating, stresses, and/or cracking that may result.

Examples of the present disclosure are directed toward overcoming the deficiencies described above.

SUMMARY OF THE INVENTION

A system described herein includes a liquid cooled component having a conduit configured to receive a hot gas and convey the hot gas from a source to a destination along at least an axis. The liquid cooled component also has a radiation shield oriented about the axis radially outward of the conduit and a liquid passage oriented about the axis radially outward of the radiation shield. The conduit includes an inner shell and an outer shell that enclose a coolant volume. The liquid cooled component also includes an expansion tank fluidly coupled with the coolant passage by a first conduit, where the first conduit has a first diameter configured to allow coolant flow and venting simultaneously. The assembly also includes a coolant reservoir fluidly coupled with the coolant passage adjacent a first end and a second end of the exhaust tube and configured to provide coolant flow into and out of the coolant passage, where the expansion tank is fluidly coupled with the coolant reservoir by a second conduit, the second conduit having a second diameter.

The liquid cooled component may include the second diameter being less than the first diameter. In some examples the first diameter may be in a range of three-quarters of an inch to one-and-one-quarter inches. In some examples the second diameter may be in a range of one-quarter to three-quarters of an inch. The expansion tank may be positioned vertically above the coolant passage such that the first conduit has a positive slope along a length of the first conduit from the liquid passage to the expansion tank. The coolant may be water-based, oil-based, or any other suitable liquid. In some examples the oil-based coolant may be used to lubricate and/or cool a turbocharger system of the engine.

An exhaust assembly as described herein includes a conduit configured to receive an exhaust gas and convey the exhaust gas from a source to a destination along at least an axis. The assembly also includes a liquid passage oriented about the axis radially outward of the conduit, the liquid passage including an inner shell and an outer shell that enclose a volume for a coolant. The component also includes an expansion reservoir fluidly coupled with the liquid passage via a first conduit having a first diameter. The component also includes a coolant reservoir fluidly coupled with the liquid passage and fluidly coupled with the expansion reservoir via a second conduit. The exhaust assembly may also include a radiation shell oriented about the axis radially outward of the conduit and within the liquid passage. The radiation shell may define one or more holes along a surface of the radiation shell. The coolant passage and expansion reservoir are in fluid communication through a first conduit that has a positive slope along a length of the first conduit from the coolant passage to the expansion reservoir. The first conduit has a first diameter; the expansion reservoir is coupled to the coolant reservoir through a second conduit, and the second conduit has a second diameter less than the first diameter. The expansion reservoir is positioned vertically above or higher (with reference to a gravitational reference frame) than the liquid passage. The first diameter is sized such that the first conduit is configured to allow coolant flow in at least a first direction and simultaneous venting of vapor in at least a second direction opposite the first direction. The first conduit couples from an upper surface of the outer shell of the liquid passage to the expansion reservoir. The first conduit couples to a lower surface and/or a bottom portion of the expansion reservoir.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Wherever possible, the same reference numbers will be used throughout the drawings to refer to the same or like parts. In the figures, the left-most digit(s) of a reference number identifies the figure in which the reference number first appears.

Figure 1:
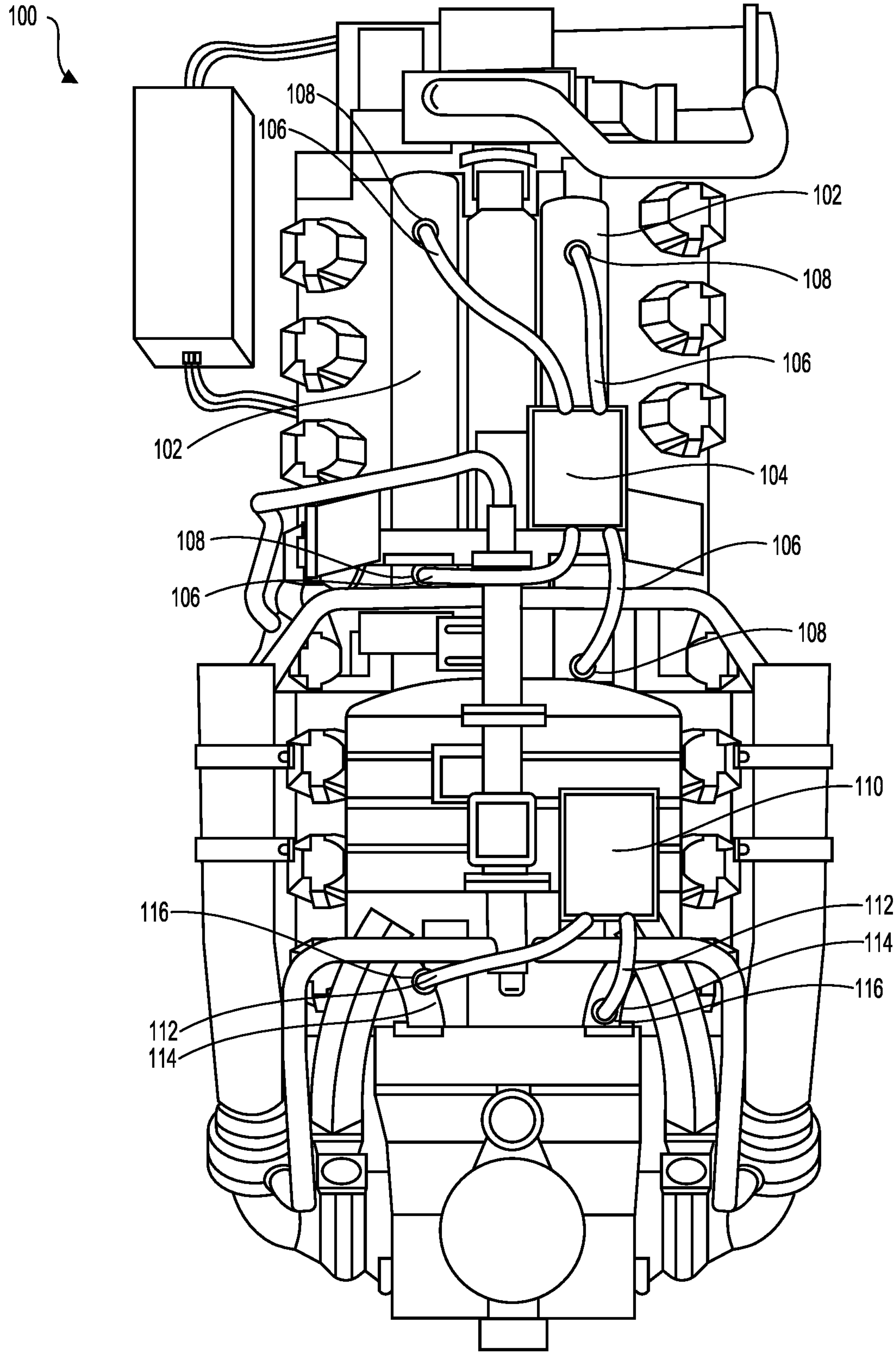
FIG. 1 illustrates a gas engine with a water-cooled exhaust assembly, according to at least one example.

FIG. 1 illustrates an engine 100 with a water-cooled exhaust assembly, according to at least one example. The engine 100 may be any engine configured to generate electricity and/or mechanical energy using a gaseous fuel, for example, such as an internal combustion engine. Gaseous fuels are fuels that are in a gaseous state under ordinary conditions such as at standard temperature and pressure. Gaseous fuels may include, for example, methane, ethane, liquified natural gas (LNG), propane, blends of these, and the like.

Though described herein with reference to gas engines, the systems and methods described herein may be implemented with other systems that are water-cooled, oil-cooled, or otherwise liquid-cooled and may experience a hot shutdown event. Though described herein with respect to water and water-based coolants, in some examples the coolant may be oil-based or other types of coolant. Additionally, such systems as described herein may include an exhaust gas recirculation cooler, turbo, and other such systems.

The engine 100 includes an exhaust manifold 102 that receives exhaust gases from the combustion chamber of the engine 100. The exhaust manifold 102 may include a water-cooled exhaust manifold to lower surface temperatures of the gas engine, for example. The exhaust manifold 102 includes ports for receiving exhaust gases from the gas engine, for example through exhaust ports of the engine. The ports provide conduits for exhaust gases to travel from the engine exhaust ports to an exhaust conduit of the exhaust manifold 102. The exhaust manifold 102 provides an exit 114 for transporting exhaust gases away from the gas engine for treatment and/or dispersal. The exhaust manifold 102 also includes a coolant exit for transporting heated coolant away from the exhaust manifold 102.

The exhaust manifold 102 includes a water-cooled sleeve that surrounds a central exhaust conduit. The water-cooled sleeve may be fed by coolant through supply lines to provide coolant circulation into and away from the exhaust manifold 102, for example to transport heat away from the exhaust manifold 102. The coolant circulation may be forced through the use of a coolant pump system of the engine 100 and/or an external pump system. The coolant circulation may cause coolant to flow along the length of the exhaust manifold 102 to absorb heat energy and transport heat energy away from the exhaust manifold 102. The water-cooled sleeve contains a coolant volume used to absorb heat energy from the exhaust gases and provide temperature control and cooling of the exhaust manifold 102.

The exhaust manifold 102 is designed with steel and cast-iron components, in some examples. The coolant may flow into and out of the water-cooled sleeve through the supply lines. During operation of the engine, the coolant is actively flowing (e.g., pumped) through the supply lines to supply coolant to the water-cooled sleeve and control the temperature of the exhaust manifold 102. When the gas engine is shut down from a full-load or high operating load, the coolant may cease to flow through the supply lines as the pump may be coupled and/or run with and/or by the engine 100 (e.g., due to the coolant pump being shutdown by shutdown of the engine) and result in stagnant coolant within the water-cooled sleeve of the exhaust manifold 102.

In typical systems, stagnant coolant within the water-cooled sleeve may result in local vapor pockets as the coolant continues to absorb heat from the exhaust manifold 102 and is not circulated through the supply lines. Such vapor pockets may result, in typical systems, in stresses and damages to the exhaust manifold 102.

If the exhaust manifold 102 is dry, especially for more than an incidental period of time, then the engine 100 may be at risk of natural gas auto ignition due to elevated temperatures that may spike at the exhaust manifold 102. The water-cooled sleeve mitigates this risk by reducing the temperatures at the exhaust manifold 102. Additionally, the water-cooled sleeve of the exhaust manifold 102 reduces a turbo turbine inlet temperature, which increases altitude capability and enables operating at increased rotational rates.

Coolant for the engine 100 passes through the engine heads and into the water-cooled sleeve of the exhaust manifold 102, which maintains the outer metal surface of the exhaust manifold 102 within a predetermined range. The exhaust manifold 102 has internal metal mass due to exhaust tubes and radiation shields (such as shown and described herein) that heats up to near exhaust temperatures while the engine 100 is operating. These components may be considerable hotter compared to the inner shell of the water-cooled sleeve that is continuously being cooled by the coolant flow. At shutdown, the coolant flow stops, and the internal heat of the exhaust manifold 102 begins to transfer into the inner shell and coolant. In some typical systems, the coolant in the manifold may boil after shutdown. Boiling causes vapor to build up in the top portion of the manifold, which can result in an air gap at the top portion of the manifold. This results in the inner coolant shell temperature increasing higher than the outer coolant shell, which results in different thermal expansion, high stresses, metal cracking, and leaks. The existing coolant lines and vent lines of typical systems do not allow for sufficient venting of vapor, therefore, the thermosiphon effect, a passive thermal management that relies on natural convection, is not effective at mitigating boiling after shutdown in such typical systems.

The exhaust manifold 102 and engine 100 described herein are equipped with an expansion tank 104 (e.g., a phase separation tank) via one or more vent lines. The one or more vent lines may include conduit 106. The engine 100 includes an expansion tank 104 (which may include one or more expansion tanks) that rest at a height above a height of the exhaust manifold 102. The conduit 106 passes from the liquid passage of the water-cooled sleeve of the exhaust manifold 102 and to the expansion tank 104. In operation, as vapor bubbles form in the exhaust manifold 102 (e.g., in the water-cooled sleeve), the vapor bubbles travel along the conduit 106 to the expansion tank 104, thereby separating the vapor bubbles from the coolant and preventing dry manifold conditions. Accordingly, the conduit 106 has a positive slope from the exhaust manifold 102 to the expansion tank 104. The conduit 106 extends from a port 108 at the exhaust manifold 102 where the conduit 106 is in fluid communication with the water-sleeve of the exhaust manifold 102.

In some examples, and as illustrated in FIG. 1, the engine 100 may include a second expansion tank 110. The second expansion tank 110 may be positioned adjacent a first end of the exhaust manifold 102 while the expansion tank 104 may be adjacent a middle portion or second end of the exhaust manifold 102. In addition to providing additional capacity, the second expansion tank 110 may enable the conduit 106 and the conduit 112 that passes from the exhaust manifold 102 (e.g., at the port 116) to the second expansion tank 110 to be substantially vertical (e.g., having a near-vertical slope). In some examples, the slope of the conduit 106 and the conduit 112 is positive across the entire length of the conduit such that vapor travels along the conduit 106 and the conduit 112 to the expansion tank 104 and the second expansion tank 110, respectively.

The expansion tank 104 and the second expansion tank 110 may each contain a volume that may be occupied by liquid as well as vapor. For instance, the expansion tank 104 and the second expansion tank 110 may each have a first portion occupied by coolant and a second portion occupied by gas. As vapor travels from the exhaust manifold 102 to the expansion tank 104 and/or the second expansion tank 110, the coolant contained therein may travel in the opposite direction along the conduit 106 and the conduit 112 to replace the volume previously occupied by the vapor at the exhaust manifold 102. In this manner, the water-cooled sleeve is not emptied or dry, but maintains liquid, even as vapor boils away and travels to the expansion tank 104 and the second expansion tank 110.

The conduit 106 and the conduit 112 may have a first diameter that enables vapor to travel from the exhaust manifold 102 to the expansion tank 104 and/or the second expansion tank 110 and simultaneously enables liquid coolant to travel in the opposite direction. The first diameter may be in a range of three-quarters of an inch to one and one-quarter inches or more. In an example, the first diameter may be one inch. This first diameter enables natural flow of gases (e.g., vapor) due to buoyancy and flow of the more (relatively) dense liquid coolant in the opposite direction. In some examples, such as when oil-based fluid is used as the coolant, the first diameter may be larger due to the increased viscosity as compared with water-based coolant. Accordingly, to accomplish the bidirectional travel through a conduit 106 having a single passageway may require a diameter greater than one inch.

In some examples, such as depicted in FIG. 1, multiple conduits 106 may travel from each exhaust manifold 102 to the expansion tank 104. In some examples, and due to the natural flow of the vapor and coolant, one or more of the multiple conduits 106 may include flow only in a single direction while a second conduit of the multiple conduits 106 may include flow in a single direction opposite the flow direction (e.g., into or out of the expansion tank) of the other conduit.

In some examples, each exhaust manifold 102 may have one or more expansion tanks. Accordingly, in a system where each exhaust manifold has two expansion tanks, the engine 100 may have four expansion tanks distributed across the exhaust manifolds 102.

The expansion tank 104 and the second expansion tank 110 may each couple to a coolant reservoir, such as a shunt tank, or other portion of the cooling system such that coolant is always available at the expansion tank 104 and the second expansion tank 110. The expansion tank and second expansion tank 110 may be coupled to the coolant reservoir through a second set of conduits (not pictured in FIG. 1) that have a second diameter. The second diameter is less than the first diameter. The second diameter may be in a range of up to three-quarters of an inch and/or in a range of one-quarter of an inch to three-quarters of an inch. The second diameter is smaller than the first diameter such that the coolant system does not bypass through the expansion tank 104 but instead provides for the coolant system of the engine 100 to operate as designed, while also enabling use of the expansion tank 104. A larger diameter conduit to the coolant reservoir may result in natural convection causing bypass flows that would alter the performance of the coolant system for the engine 100.

Figure 4:
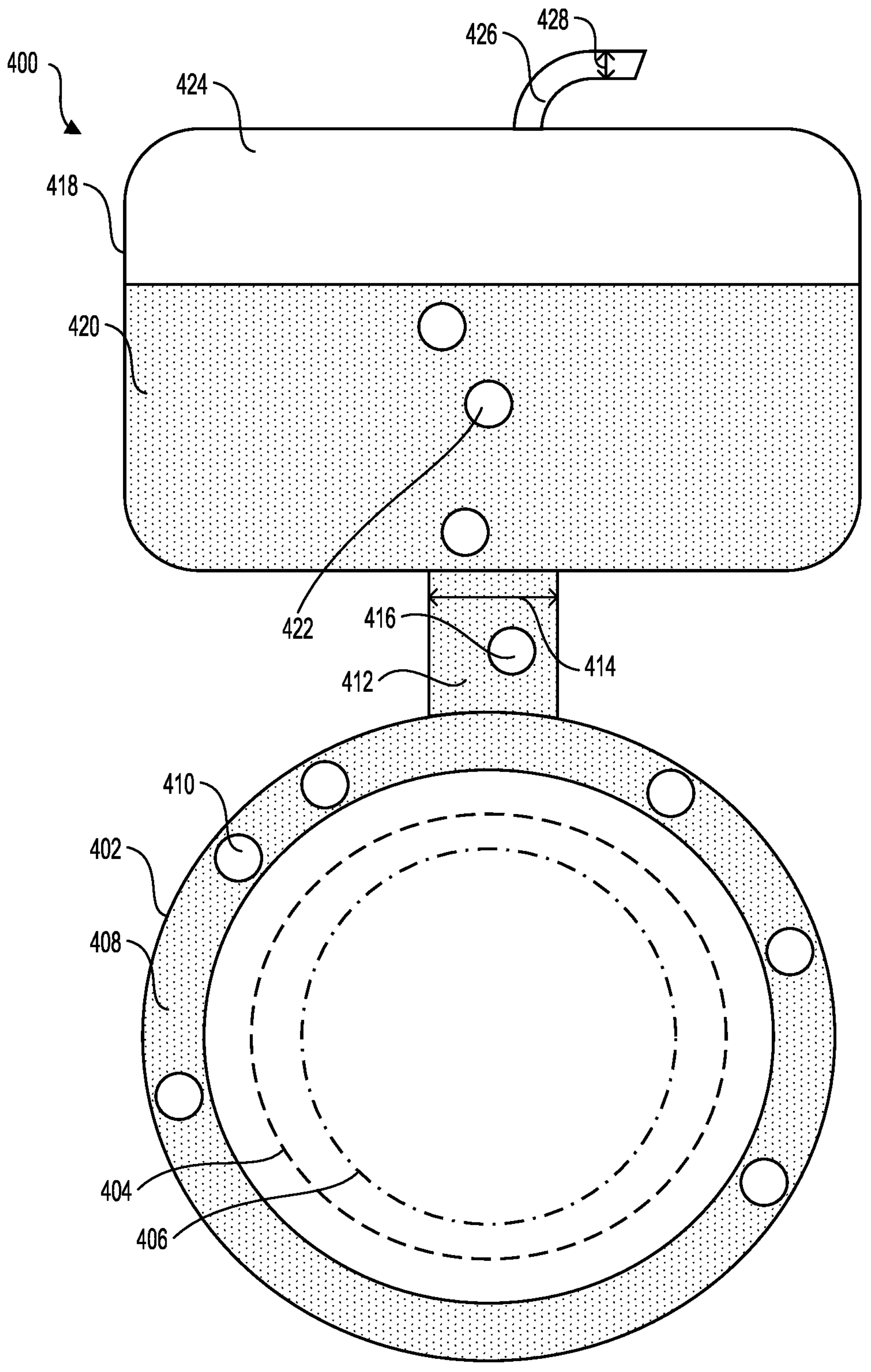
FIG. 4 illustrates a cross-section view illustrating a water-cooled exhaust assembly with an expansion tank, according to at least one example.

Accordingly, the expansion tank 104, provides for preventing overheating of the exhaust manifold during or after a hot shutdown of the engine 100. Accordingly, heat stored within the exhaust manifold 102 (e.g., within the metal) may be absorbed by coolant and may result in boiling of the coolant. The vapor may then rise up the conduit 106 and out of the exhaust manifold to the expansion tank 104, and be replaced within the exhaust manifold by coolant from the expansion tank 104 that flows down along the conduit 106 due to gravity and natural pressures within the system. The internal structure of the exhaust manifold 102 may provide for such benefits, as shown in FIG. 4.

In examples and systems described herein, the exhaust manifold 102 may be implemented in any gas engine system without requiring any changes to the gas engine or downstream exhaust system. As such, the exhaust manifold assemblies designed with the heat capacitance ratios described herein may be retrofitted to existing systems as well as implemented on new systems of gas engines.

Figure 2:
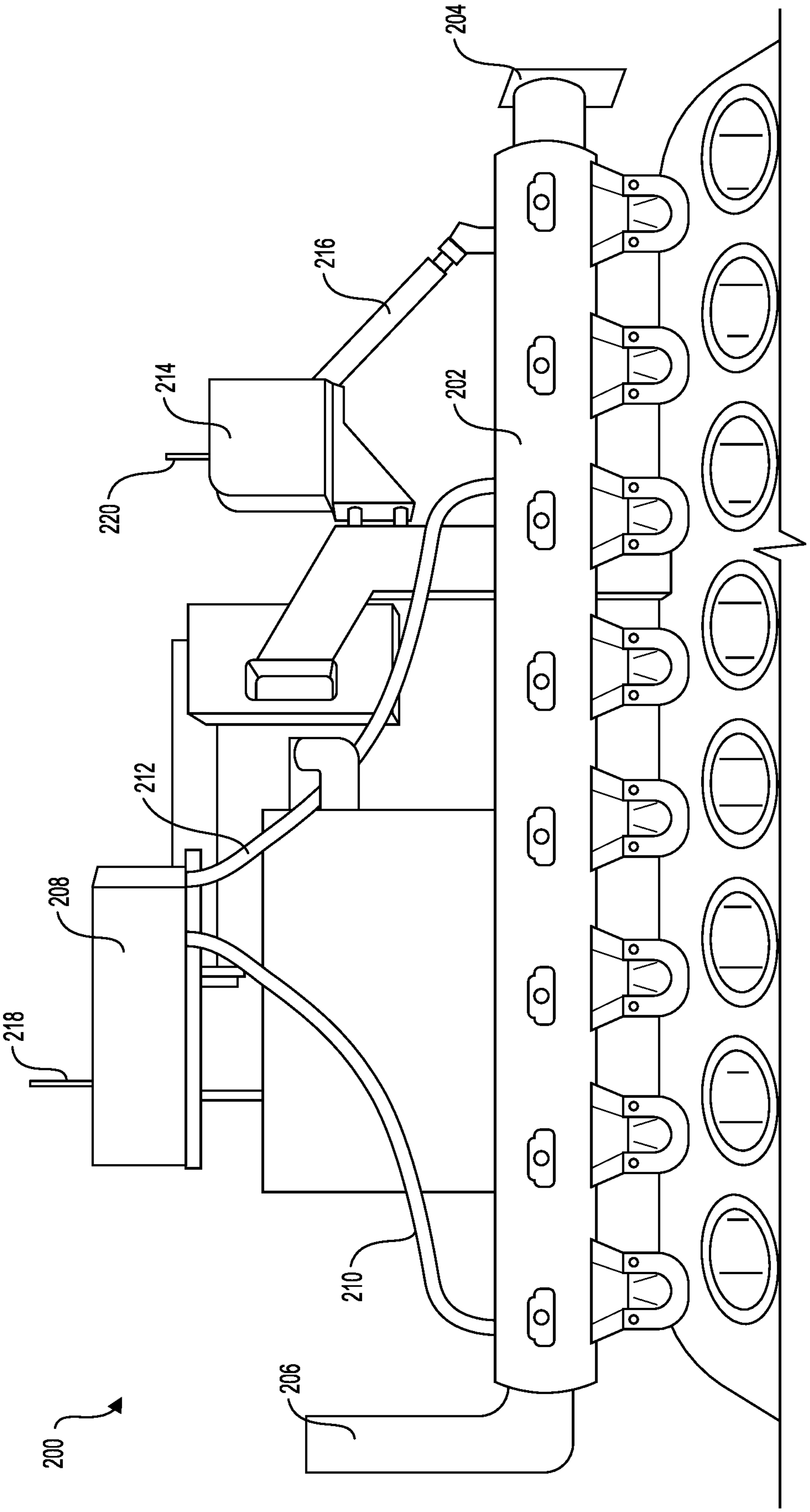
FIG. 2 illustrates a side view of the water-cooled exhaust assembly of the gas engine including expansion tanks, according to at least one example.

FIG. 2 illustrates a side view of the water-cooled exhaust assembly 200 of the engine 100 of FIG. 1 including expansion tanks, according to at least one example. The water-cooled exhaust assembly 200 includes an exhaust manifold 202 which may be the same or similar to the exhaust manifold 102 of FIG. 1. In some examples, the exhaust manifold 202 may instead be replaced by any other actively cooled component that is cooled through contact with a coolant such as water or oil. The exhaust manifold 202 delivers exhaust gases from the engine to an exit 206 where the exhaust gases may be released and/or used to feed into a turbocharger system.

The exhaust manifold 202 is a water-cooled manifold that includes a sleeve around the exhaust conduit of the exhaust manifold 202. In particular, the exhaust manifold 202 may include an inner conduit that has an axis about which the inner conduit is disposed. The water sleeve is disposed radially outward of the inner conduit such that coolant contained by the water sleeve at least partially surrounds the inner conduit. In some examples, the exhaust manifold 202 may include a radiation shield between the inner conduit and the water sleeve, such as depicted in FIG. 4.

The exhaust manifold 202 receives coolant at an inlet 204 where the coolant is provided by a coolant system of the engine. The coolant system may pump the coolant or otherwise provide for flow of the coolant such that the coolant actively circulates to cool the exhaust manifold 202 and/or additional other components of the engine. An outlet of the exhaust manifold provides for coolant to leave the exhaust manifold 202 to travel to a subsequent system such as a radiator or other component included in the coolant system of the engine.

The water-cooled exhaust assembly 200 includes a first expansion tank 208 and a second expansion tank 214. The first expansion tank 208 and the second expansion tank 214 may be formed of any suitable material including metals, plastics, composites, or other such materials that may withstand the temperatures of the vapor and the coolant. The first expansion tank 208 fluidly couples with the exhaust manifold 202, specifically with the water sleeve of the exhaust manifold 202. The first pipe 210 provides a first conduit from at or near a first end of the exhaust manifold to the first expansion tank 208. A second pipe 212 provides a second conduit from a middle portion of the exhaust manifold 202 to the first expansion tank 208. A third pipe 216 provides a third conduit from at or near a second end of the exhaust manifold 202 to the second expansion tank 214. The first pipe 210, second pipe 212, and third pipe 216 may be formed of a hydraulic line, rubber line, plastic line, metal, or other liquid and gas-tight material that may withstand the temperatures of the coolant and vapor.

The first expansion tank 208 and the second expansion tank 214 may each contain a volume that may be occupied by liquid as well as vapor. For instance, the first expansion tank 208 and the second expansion tank 214 may each have a first portion occupied by coolant and a second portion occupied by gas. As vapor travels from the exhaust manifold 202 to the first expansion tank 208 and/or the second expansion tank 214, the coolant contained therein may travel in the opposite direction along the conduits to replace the volume previously occupied by the vapor at the exhaust manifold 202. In this manner, the water-cooled sleeve of the exhaust manifold 202 is not emptied or dry, but maintains liquid, even as vapor boils away and travels to the first expansion tank 208 and the second expansion tank 214.

The first pipe 210, second pipe 212, and third pipe 216 are shown in a particular configuration and orientation, but may be connected to the exhaust manifold at any position. In one embodiment, the pipes couple to the exhaust manifold 202 at an upper surface of the water sleeve such that as vapor is formed within the water sleeve the gases travel along the pipes to the expansion tanks. The pipes may have a first diameter that enables vapor to travel from the exhaust manifold 202 to the first expansion tank 208 and/or the second expansion tank 214 and simultaneously enables liquid coolant to travel in the opposite direction. The first diameter may be in a range of three-quarters of an inch to one and one-quarter inches or more. In an example, the first diameter may be one inch. This first diameter enables natural flow of gases (e.g., vapor) due to buoyancy and flow of the more (relatively) dense liquid coolant in the opposite direction. In some examples, such as when oil-based fluid is used as the coolant, the first diameter may be larger due to the increased viscosity as compared with water-based coolant. Accordingly, to accomplish the bidirectional travel through a single conduit may require a diameter greater than one inch.

The first expansion tank 208 and the second expansion tank 214 are positioned at a first height and a second height relative to a height of the exhaust manifold 202. The first height and the second height are greater than the height of the exhaust manifold such that vapor will flow to the expansion tanks from the exhaust manifold 202 through the conduits. The first height and the second height may be different and/or the same in various embodiments, so long as the first height and the second height are greater than a height of the exhaust manifold 202. Additionally, as described herein, the conduits have a positive slope along the length of the conduits from the exhaust manifold 202 to the expansion tanks such that the vapor may travel solely due to buoyancy and not be trapped within the pipes. Further the conduits couple to the expansion tanks at a bottom surface and/or near a bottom surface of the expansion tanks such that the liquid coolant of the expansion tanks is at the entrance of the conduits into the expansion tanks and able to flow downwards along the conduits to the exhaust manifold 202.

The first expansion tank 208 and the second expansion tank 214 may each couple to a coolant reservoir, such as a shunt tank, or other portion of the cooling system such that coolant is provided to the first expansion tank 208 and the second expansion tank 214 to maintain a level of coolant within the expansion tanks such that as vapor is generated within the exhaust manifold the volume of the vapor may be replaced by coolant from the expansion tanks. The first expansion tank 208 and second expansion tank 214 may be coupled to the coolant reservoir through a second set of conduits that have a second diameter. For instance, the first expansion tank 208 couples through a tube 218 and the second expansion tank 214 couples to the coolant reservoir through a tube 220. The second diameter is less than the first diameter. The second diameter may be in a range of up to three-quarters of an inch and/or in a range of one-quarter of an inch to three-quarters of an inch. The second diameter is smaller than the first diameter such that the coolant system does not bypass through the expansion tank but instead provides for the coolant system of the engine to operate as designed, while also enabling use of the expansion tank. A larger diameter conduit to the coolant reservoir may result in natural convection causing bypass flows that would alter the performance of the coolant system for the engine.

The coolant within the water sleeve of the exhaust manifold 202 absorbs heat from the exhaust gases to control the temperature at the manifold and/or exhaust gases for one or more purposes, such as to prevent reignition, maintain temperatures at a turbocharger, or other such reasons.

Figure 3:
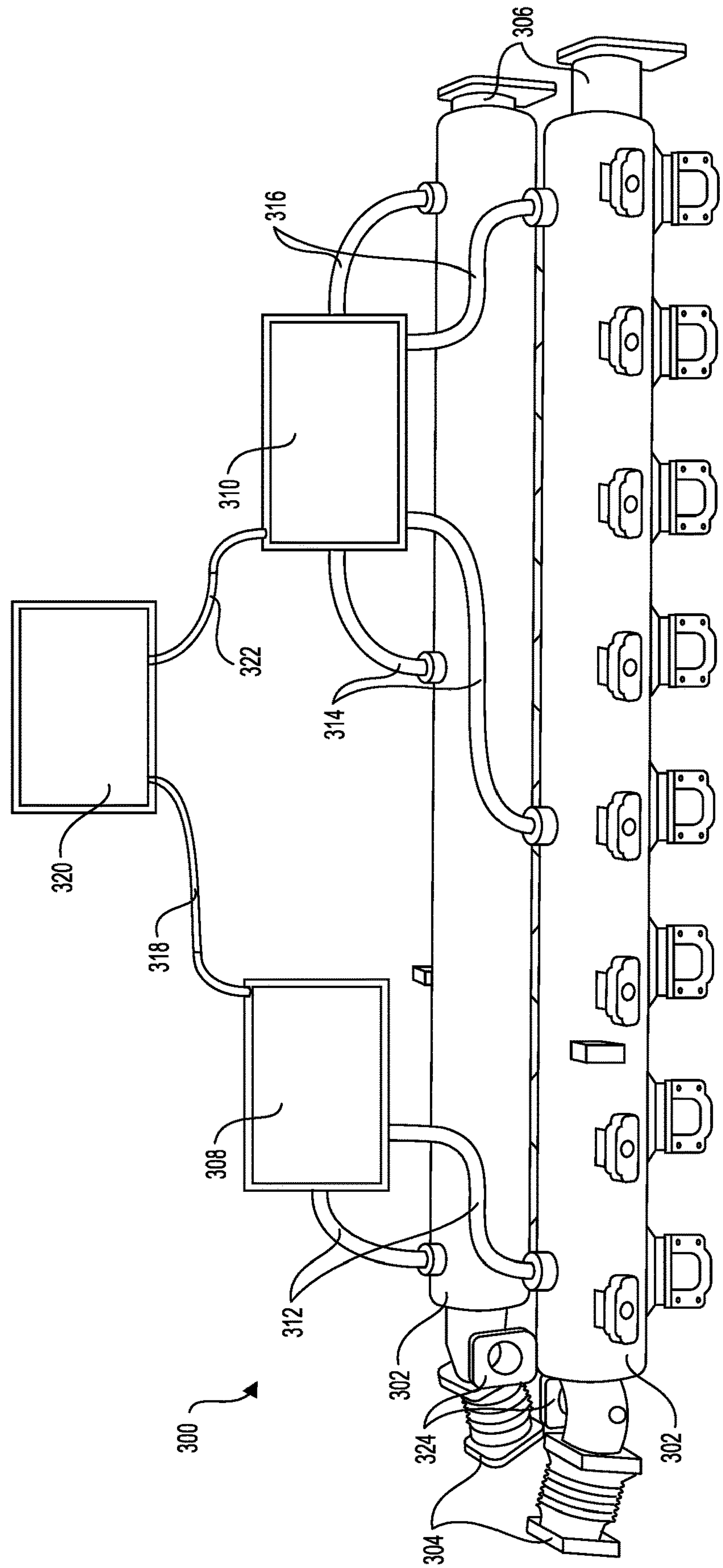
FIG. 3 illustrates a perspective view of a water-cooled exhaust assembly and coolant system, according to at least one example.

FIG. 3 illustrates a perspective view of a water-cooled exhaust assembly 300 and coolant system, according to at least one example. The water-cooled exhaust assembly 300 includes exhaust manifolds 302 similar and/or identical to the exhaust manifolds 102 and/or exhaust manifolds 202 described herein. The water-cooled exhaust assembly 300 further includes exhaust exits 304 where exhaust gases are directed to exit the exhaust manifolds 302. The water-cooled exhaust assembly 300 further includes coolant inlets 306 and coolant exits 324 for the coolant system of an engine or other system to actively circulate coolant through the exhaust manifolds 302.

The water-cooled exhaust assembly 300 includes a first expansion tank 308, a second expansion tank 310, and a coolant reservoir 320. The first expansion tank 308 and the second expansion tank 310 may be similar and/or identical to the first expansion tank 208 and the second expansion tank 214 of FIG. 2, respectively. The first expansion tank 308 fluidly couples with the exhaust manifolds 302 through pipes 312 and the second expansion tank 310 fluidly couples with the exhaust manifolds 302 through pipes 314 and 316. Though depicted as having two expansion tanks with three sets of tubes, the water-cooled exhaust assembly 300 may have more or fewer numbers of expansion tanks (e.g., one, two, three, four, five, six, or more). Additionally, the first expansion tank 308 and the second expansion tank 310 are depicted as coupled to both exhaust manifolds 302. In some examples, each of the exhaust manifolds 302 may have separate expansion tanks. In some examples, the expansion tanks may each have one, two, three, four, or more tubes that couple to the exhaust manifolds 302.

The first expansion tank 308 fluidly couples with a coolant reservoir 320 through a pipe 318. The second expansion tank 310 fluidly couples with the coolant reservoir 320 through a pipe 322. The coolant reservoir 320 may be positioned or stored in a separate area within an implementation of the water-cooled exhaust assembly 300. The coolant reservoir 320 may be capable of providing coolant to the expansion tanks to maintain a level of coolant within the expansion tanks. The level of coolant may be controlled through the use of level measurement systems such as laser level indicators, floats, and the like. In some examples, the pipe 318 and the pipe 322 may include one or more valves that may be actuated to provide coolant into the expansion tanks. The valves may be actuated manually in some examples to increase the level of coolant to a desired level. The valves may be actuated automatically based on a control system that receives sensor data from a float or level sensor within the expansion tanks. The valves may also be actuated to open upon a shutoff of the engine to provide coolant to the expansion tanks upon a hot shutdown event. The coolant reservoir 320 may provide coolant to the expansion tanks through a pumping or circulation system of the engine. In some examples the coolant may be pumped or circulated into the expansion tanks as part of the coolant circulation within the engine. The relatively smaller diameter of the pipe 318 and pipe 322 as compared with the pipes 312, pipes 314, and pipes 316 results in free natural convection and circulation through the pipes 312, pipes 314, and pipes 316 (as described herein) while natural convection and flow through pipe 318 and pipe 322 may be limited to prevent bypassing the coolant system of the engine.

FIG. 4 illustrates a cross-section view illustrating a water-cooled exhaust assembly 400 with an expansion tank 418, according to at least one example. The water-cooled exhaust assembly 400 includes an exhaust manifold 402 that has an exhaust conduit 406 for transporting exhaust gases, a radiation shield 404 disposed radially outward from the exhaust conduit, and a water-cooled sleeve 408 that contains coolant from the coolant system.

The water-cooled exhaust assembly 400 further includes a conduit 412 from an upper surface of the water-cooled sleeve 408 to an expansion tank 418. The expansion tank 418 is shown having a first portion 420 with liquid coolant and a second portion 424 with gas or vapor.

The inner shell of the water-cooled sleeve 408 is oriented annularly about an axis that lies along a center of the exhaust conduit 406 and radially outward of the radiation shield 404. The coolant (water, for example) flows into the water-cooled sleeve 408 that may have an annular shape. Exhaust gases may, in some examples, flow through the annular passage between the radiation shield 404 and the inner shell of the water-cooled sleeve 408 and/or the exhaust conduit 406. In such examples, the exhaust conduit 406 and/or radiation shield 404 may each define one or more passages, openings, or conduits to enable exhaust gases to travel from the exhaust conduit to the interstitial spaces between the exhaust conduit 406, radiation shield 404, and inner shell of the water-cooled sleeve 408.

The expansion tank 418 has a conduit 426 that provides a fluid connection to a coolant reservoir. The conduit 426 has a diameter 428 that is less than the diameter 414. The conduit 412 may have a diameter 414 that enables vapor 410 that forms in the exhaust manifold 402 to travel from the exhaust manifold 402 to the expansion tank 418 and simultaneously enables liquid coolant to travel in the opposite direction. The diameter 414 may be in a range of three-quarters of an inch to one and one-quarter inches or more. In an example, the diameter 414 may be one inch. This diameter 414 enables natural flow of gases (e.g., vapor) due to buoyancy and flow of the more (relatively) dense liquid coolant in the opposite direction. In some examples, such as when oil-based fluid is used as the coolant, the diameter 414 may be larger than one inch due to the increased viscosity as compared with water-based coolant. Accordingly, to accomplish the bidirectional travel through the conduit 412 may require a diameter greater than one inch. The expansion tank 418 may couple to a coolant reservoir, such as a shunt tank, or other portion of the cooling system such that coolant is always available at the expansion tank 418. The expansion tank 418 may be coupled to the coolant reservoir through the conduit 426 that has a diameter 428. The diameter 428 is less than the diameter 414. The diameter 428 may be in a range of up to three-quarters of an inch and/or in a range of one-quarter of an inch to three-quarters of an inch. The diameter 428 is smaller than the diameter 414 such that the coolant system does not bypass through the expansion tank 418 but instead provides for the coolant system of the engine to operate as designed, while also enabling use of the expansion tank 418. A larger diameter conduit to the coolant reservoir may result in natural convection causing bypass flows that would alter the performance of the coolant system for the engine.

The coolant within the water-cooled sleeve 408 passes through the engine heads and into the water-cooled sleeve 408 of the exhaust manifold 402, which maintains the outer metal surface of the exhaust conduit 406 and/or the exhaust manifold 402 within a predetermined range. The exhaust manifold 402 has internal metal mass due to exhaust tubes and radiation shields (such as shown and described herein) that heats up to near exhaust temperatures while the engine is operating. These components may be considerable hotter compared to the inner shell of the water-cooled sleeve 408 that is continuously being cooled by the coolant flow. At shutdown, the coolant flow stops, and the internal heat of the exhaust manifold 402 begins to transfer into the coolant. In some typical systems, the coolant in the manifold may boil after shutdown. Boiling causes vapor 410 to build up in the exhaust manifold 402, specifically within the water-cooled sleeve 408, which can result in an air gap at the top portion of the water-cooled sleeve 408. The vapor 416 travels, instead of gathering, up the conduit 412 and into the expansion tank 418. At the same time, coolant from the first portion 420 flows down the conduit 412 into the water-cooled sleeve 408 to prevent overheating of the exhaust manifold 402.

INDUSTRIAL APPLICABILITY

The present disclosure provides systems and methods for preventing coolant boiling in post-shutdown environments of water-cooled exhaust manifolds to reduce damage to parts and components. In typical systems, stagnant coolant within the water-cooled sleeve of the manifold may result in local vapor pockets as the coolant continues to absorb heat from the exhaust manifold assembly and is not circulated through coolant supplies. Such vapor pockets may result, in typical systems, in stresses and damages to the exhaust manifold assembly. Such stressed and damages lead to excessive part wear and costly downtime for equipment.

Accordingly, the exhaust manifold assembly described herein, provides for preventing creation of the vapor pockets by having an expansion tank and at or near vertical conduits that have a diameter sufficient to allow bidirectional simultaneous travel of vapor and coolant between the manifold and the expansion tank to prevent collection of vapor within the water-cooled manifold that would otherwise result in overheating and damage to the exhaust manifold. Accordingly, heat stored within the exhaust manifold assembly (e.g., within the metal) may be absorbed by coolant and as coolant vaporizes, it is replaced by coolant from the expansion tank such that the coolant does not boil away and leave the exhaust manifold with vapor pockets during a hot shutdown event.

In one illustrative example, the engine is a Caterpillar G3500 gas engine used to convert landfill gas into electrical energy. The engine includes a water-cooled exhaust manifold. The manifold includes an exhaust tube defining a main exhaust passage. The exhaust tube includes one or more holes in the end of the tube opposite an exhaust outlet. The exhaust enters the manifold through several exhaust inlets and flows from the inlets to the exhaust outlet. A water jacket is oriented radially outward of the exhaust tube and configured to carry water to provide cooling for exhaust surfaces. The water jacket and exhaust tube may be separated by a radiation shield. The exhaust flows from the hole, through the passage, to the exhaust outlet during steady state operation of the engine. After a hot shutdown event, the water jacket contains coolant and connection to an expansion tank such that residual heat that causes coolant boiling allows vapor to collect away from the exhaust manifold and be replaced by liquid coolant at the exhaust manifold flowing from the expansion tank and thereby preventing associated damage to engine components.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A liquid cooled component comprising
- a conduit configured to receive an exhaust gas and convey the exhaust gas from a source to a destination along at least an axis;
- a liquid passage oriented about the axis radially outward of the conduit, the liquid passage including an inner shell and an outer shell that enclose a coolant volume;
- an expansion reservoir fluidly coupled with the liquid passage via a first conduit, wherein the first conduit:
  - has a first diameter greater than three-quarters of an inch; and
  - has a positive slope with respect to gravity along an entire length of the first conduit from the liquid passage to the expansion reservoir; and
- a coolant reservoir fluidly coupled with the expansion reservoir via a second conduit having a second diameter and a controllable valve configured to maintain a coolant level within the expansion tank within a predetermined range.

2. The liquid cooled component of claim 1, wherein the second diameter is less than the first diameter.

3. The liquid cooled component of claim 2, wherein the first diameter is in a range of three-quarters of an inch to one-and-one quarter inches.

4. The liquid cooled component of claim 1, wherein the expansion reservoir is positioned vertically, with respect to gravity, higher than the liquid passage.

5. The liquid cooled component of claim 1, wherein the first diameter of the first conduit is configured to enable coolant flow in at least a first direction and simultaneous venting of vapor in at least a second direction opposite the first direction.

6. The liquid cooled component of claim 1, further comprising a radiation shield oriented about the axis radially outward of the conduit and radially inward of the liquid passage.

7. The liquid cooled component of claim 1, wherein the first conduit is coupled to the liquid passage at an upper surface of the liquid passage.

8. An exhaust manifold comprising:
- a conduit oriented about an axis, wherein an exhaust gas is configured to flow through the conduit away from an engine;
- a coolant passage oriented about the axis radially outward of the conduit, the coolant passage including an inner shell and an outer shell that define a coolant volume;
- an expansion reservoir in fluid communication with the coolant passage via a first conduit, wherein the first conduit:
  - has a first diameter greater than three-quarters of an inch; and
  - has a positive slope with respect to gravity along an entire length of the first conduit from the coolant passage to the expansion reservoir; and
- a coolant reservoir in fluid communication with the expansion reservoir.

9. The exhaust manifold of claim 8, further comprising a radiation shield oriented about the axis radially outward of the conduit, and wherein the radiation shield defines one or more holes arranged along a length of the radiation shield.

10. The exhaust manifold of claim 8, wherein the expansion reservoir is positioned vertically, with respect to gravity, higher than the coolant passage.

11. The exhaust manifold of claim 10, wherein:
- the expansion reservoir is coupled to the coolant reservoir through a second conduit; and
- the second conduit has a second diameter smaller than the first diameter.

12. The exhaust manifold of claim 11, wherein the second conduit is configured to provide coolant flow into and out of the expansion reservoir in response to sensor data from a level sensor to maintain a coolant level above a threshold level within the expansion reservoir, the threshold level associated with a volume of coolant to maintain coolant within the coolant passage after a hot shutdown event.

13. An exhaust assembly comprising:
- an exhaust tube oriented about an axis, wherein an exhaust gas is configured to flow through the exhaust tube away from an engine;
- a radiation shield oriented about the axis radially outward of the exhaust tube; and
- a coolant passage oriented about the axis radially outward of the radiation shield, the coolant passage including an inner shell and an outer shell that define a volume for containing coolant;
- an expansion tank fluidly coupled with the coolant passage by a first conduit, wherein the first conduit:

has a first diameter greater than three-quarters of an inch and configured to enable coolant flow in a first direction and vapor venting in a second direction opposite the first direction simultaneously; and has a positive slope with respect to gravity along an entire length of the first conduit from the coolant passage to the expansion tank; and a coolant reservoir fluidly coupled with the expansion tank and configured to provide coolant flow into and out of the expansion tank by a second conduit in response to sensor data from a level sensor to maintain a coolant level within the expansion tank, the second conduit having a second diameter less than the first diameter.

14. The exhaust assembly of claim 13, wherein the second diameter is less than the first diameter.

15. The exhaust assembly of claim 14, wherein the first diameter is in a range of three-quarters of an inch to one-and-one-quarter inches.

16. The exhaust assembly of claim 13, wherein the expansion tank is positioned vertically, with respect to gravity, above the coolant passage.

17. The exhaust assembly of claim 13, wherein the coolant comprises a water-based coolant.

18. The exhaust assembly of claim 13, wherein the coolant comprises an oil-based coolant.

19. The exhaust assembly of claim 18, wherein the coolant reservoir is further configured to deliver the coolant to a turbocharger system for cooling and lubrication of the turbocharger system.

* * * * *